United States Patent [19]
Watanabe

[11] Patent Number: 5,467,226
[45] Date of Patent: Nov. 14, 1995

[54] OPTICAL APPARATUS HAVING A LENS FOR ZOOMING MOVABLE TO A ZOOM AREA AND A MACRO AREA

[75] Inventor: Takashi Watanabe, Fuchu, Japan

[73] Assignee: Canon Kabushiki Kaisha, Tokyo, Japan

[21] Appl. No.: 121,215

[22] Filed: Sep. 14, 1993

Related U.S. Application Data

[63] Continuation of Ser. No. 760,688, Sep. 16, 1991, abandoned.

[30] Foreign Application Priority Data

Sep. 18, 1990 [JP] Japan ................................. 2-249629

[51] Int. Cl.⁶ ................................................ G02B 7/10
[52] U.S. Cl. ........................ 359/693; 359/694; 359/698; 359/702; 359/705
[58] Field of Search ...................... 359/693, 694, 359/696, 697, 698, 702, 705, 706, 823, 825, 745

[56] References Cited

U.S. PATENT DOCUMENTS

| | | | |
|---|---|---|---|
| 3,784,285 | 1/1974 | Watanabe et al. | 359/693 X |
| 3,884,555 | 5/1975 | Suwa et al. | 359/693 X |
| 4,099,847 | 7/1978 | Ito | 359/693 X |
| 4,110,005 | 8/1978 | Bohm et al. | 359/693 X |
| 4,333,712 | 6/1982 | Tomori | 359/705 |
| 4,472,032 | 9/1984 | Kamata et al. | 359/694 |
| 4,577,934 | 3/1986 | Aoyagi et al. | 359/694 X |
| 4,720,182 | 1/1988 | Imanari | 359/705 |
| 4,825,237 | 4/1989 | Hatase et al. | 359/705 |
| 4,890,132 | 12/1989 | Hama | 359/694 X |
| 4,899,190 | 2/1990 | Hata | 354/400 |
| 5,028,773 | 7/1991 | Hata | 250/201.3 |
| 5,091,802 | 2/1992 | Imaoka et al. | 359/694 |
| 5,115,348 | 5/1992 | Notagashira | 359/694 X |
| 5,144,493 | 9/1992 | Nomura | 359/693 |

*Primary Examiner*—David C. Nelms
*Assistant Examiner*—Huan Hoang
*Attorney, Agent, or Firm*—Robin, Blecker, Daley & Driscoll

[57] ABSTRACT

An optical apparatus has a lens for zooming movable to a zoom area and a macro area, and a stopper operable to be changed over to a first state in which the movement of the lens from the zoom area to the macro area is prohibited and a second state in which the prohibition is released. A locking portion is provided so that the second state by the stopper can be maintained.

18 Claims, 7 Drawing Sheets

OPTICAL APPARATUS HAVING A LENS FOR ZOOMING MOVABLE TO A ZOOM AREA AND A MACRO AREA

This is a continuation application under 37 CFR 1.62 of prior application Ser. No. 760,688, filed Sep. 16, 1991, now abandoned.

BACKGROUND OF THE INVENTION

1. Field of the Invention

This invention relates to an optical apparatus having an optical system in which a lens is movable to a zoom area and a macro area.

2. Related Background Art

In a photo-taking lens in a conventional optical apparatus, when wide macro photographing is to be effected, a macro button has been operated in a radial direction or a thrust direction to thereby release the stopper function of the macro button, and a zoom ring has been rotated to the other macro area than that between the telephoto end and the wide end of zoom to thereby accomplish wide macro photographing. Also, in a camera as an optical apparatus which can accomplish wide macro photographing by auto focus, when an object is within the wide macro photographing distance during normal photographing, photographing is possible by auto focus. Also, when a zoom ring is to be manually rotated, the zoom ring is rotatively operated while a macro button is operated, but in an ordinary case, the macro button has a function as a stopper and makes the zoom ring rotatively operable only between the telephoto end and the wide end of the zoom area.

However, in the former case of the above-described examples of the prior art, when usually changeover is to be effected from the zoom area to wide macro photographing by auto focus, there is only a method of manually operating the macro button to thereby accomplish the changeover, and this has led to the disadvantage that the changeover cannot be effected continuously. Also, when still after the changeover, photographing is effected near the wide end of the wide macro area, hunting is sometimes effected by auto focus, and there is the disadvantage that when the macro button is operated from the wide macro area to change over to the zoom area, second changeover to the wide macro area must be effected by manually putting the macro button again into the wide macro area.

SUMMARY OF THE INVENTION

One aspect of the invention is to provide stopper means capable of prohibiting/releasing the shift of an optical system between a zoom area and a macro area, and enable the stopper means to be maintained in a state for releasing the prohibition, thereby making the continuous shift from the zoom area to the macro area possible.

One aspect of the invention is to discriminate, when the optical system is shifted from the zoom area to the macro area, whether the stopper means is in its movement-prohibited state or in its movement-allowed state by the shifted state of the optical system.

DESCRIPTION OF THE PREFERRED EMBODIMENT

Figure 1:
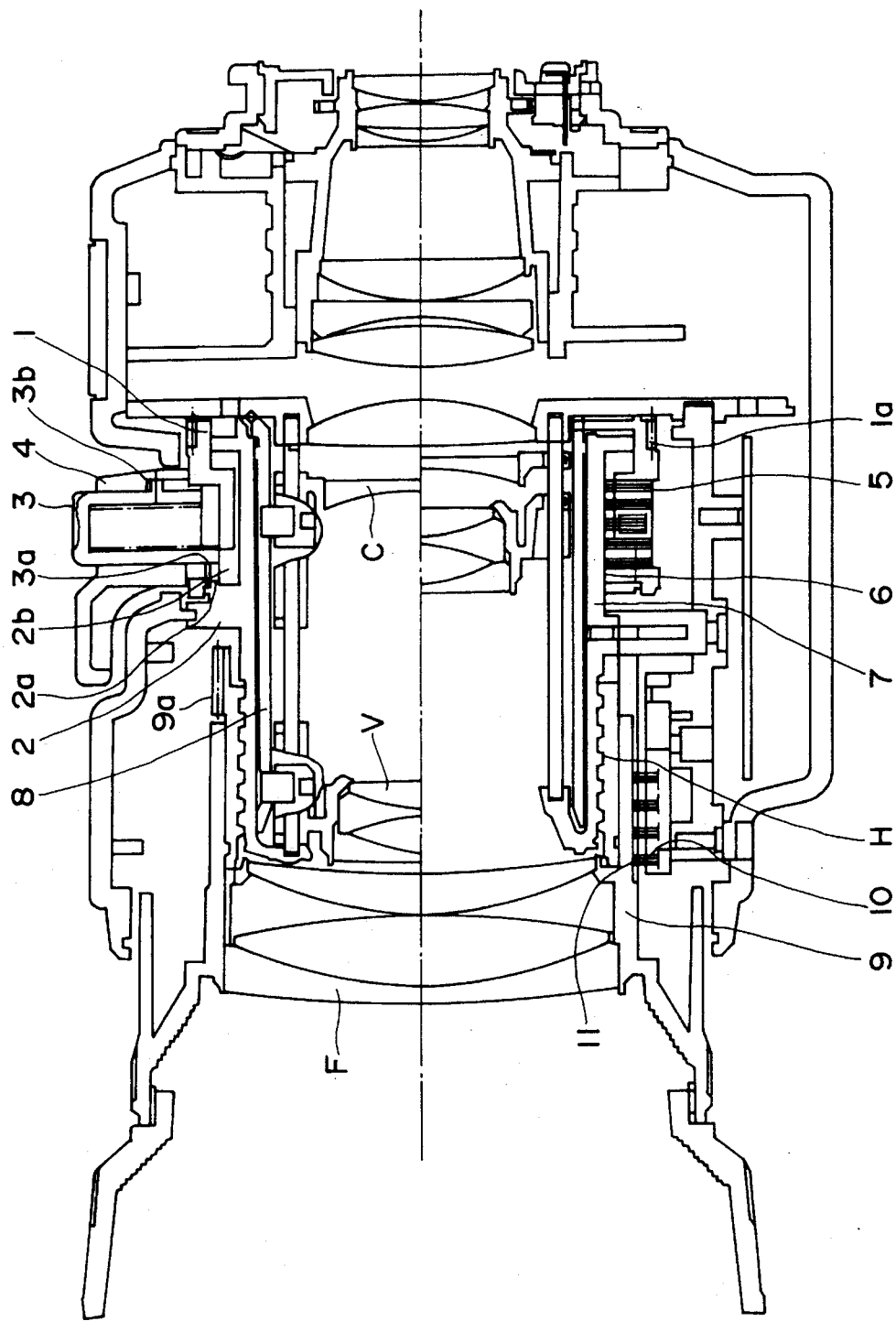
FIG. 1 is a cross-sectional view of a lens as an embodiment of the present invention.
Figure 2A:
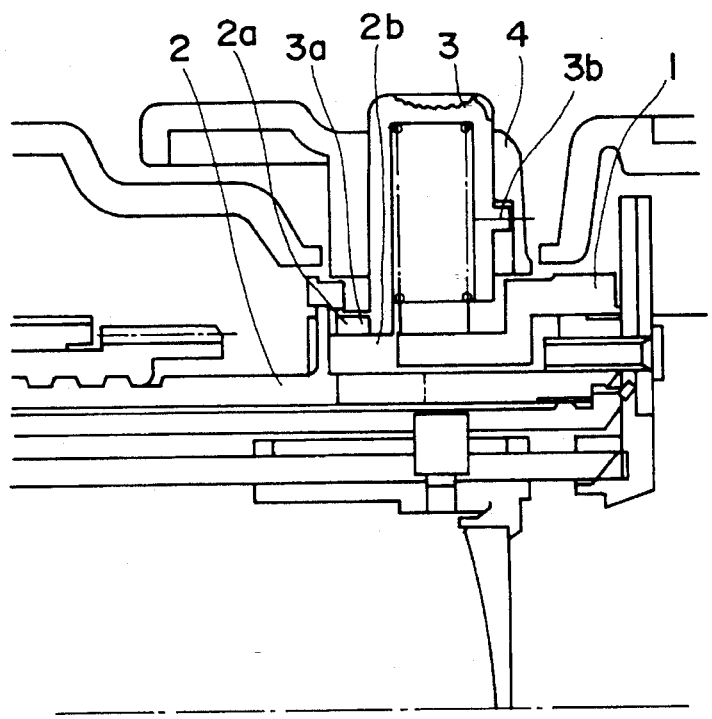
FIGS. 2A and 2B are cross-sectional views of the essential portions of FIG. 1.
Figure 2B:
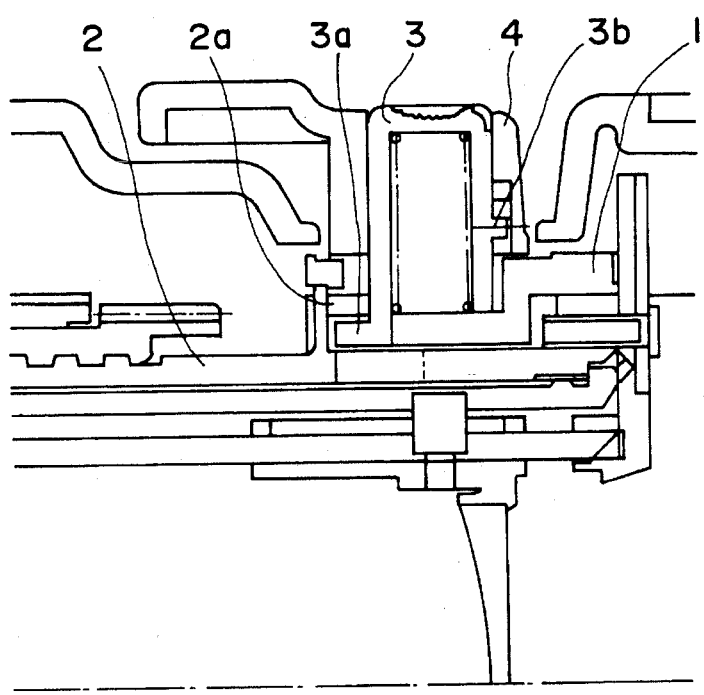
Figure 3A:
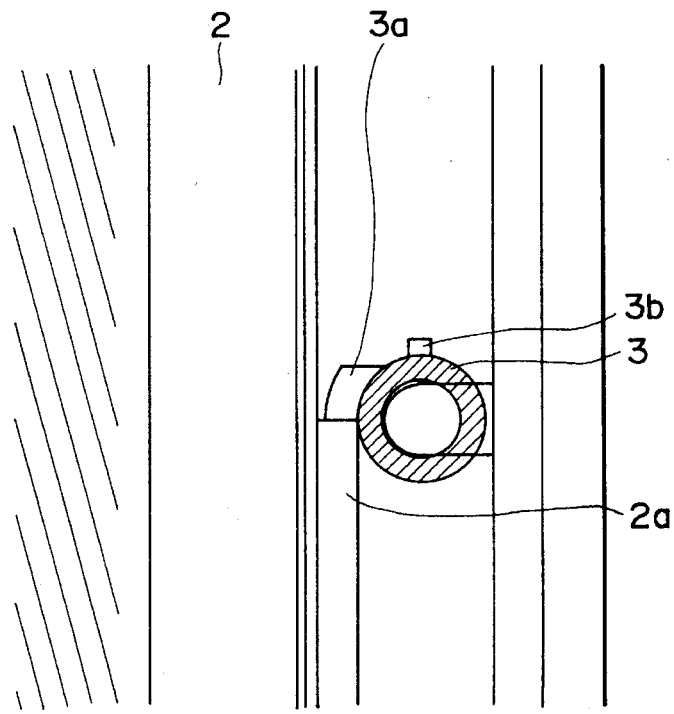
FIGS. 3A and 3B are developed views of the portions shown in FIGS. 2A and 2B.
Figure 3B:
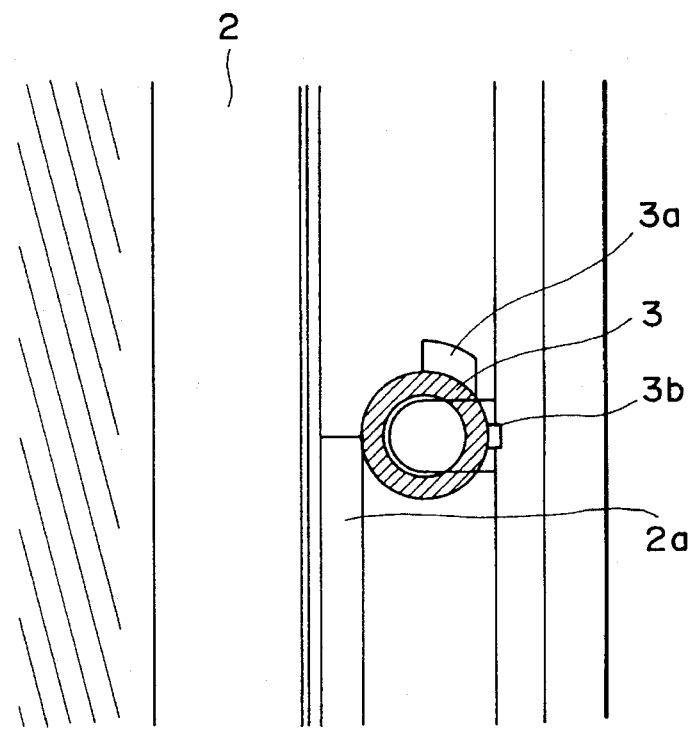
Figure 4:
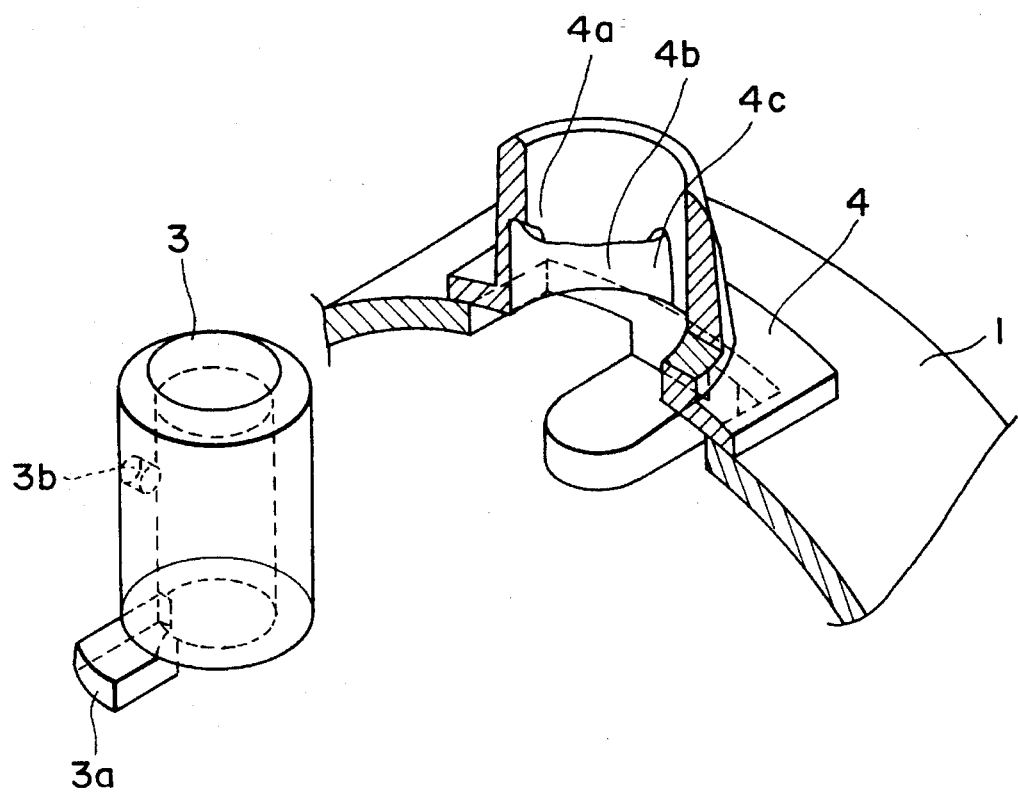
FIG. 4 is a perspective view of the portions shown in FIGS. 2A and 2B.
Figure 5:
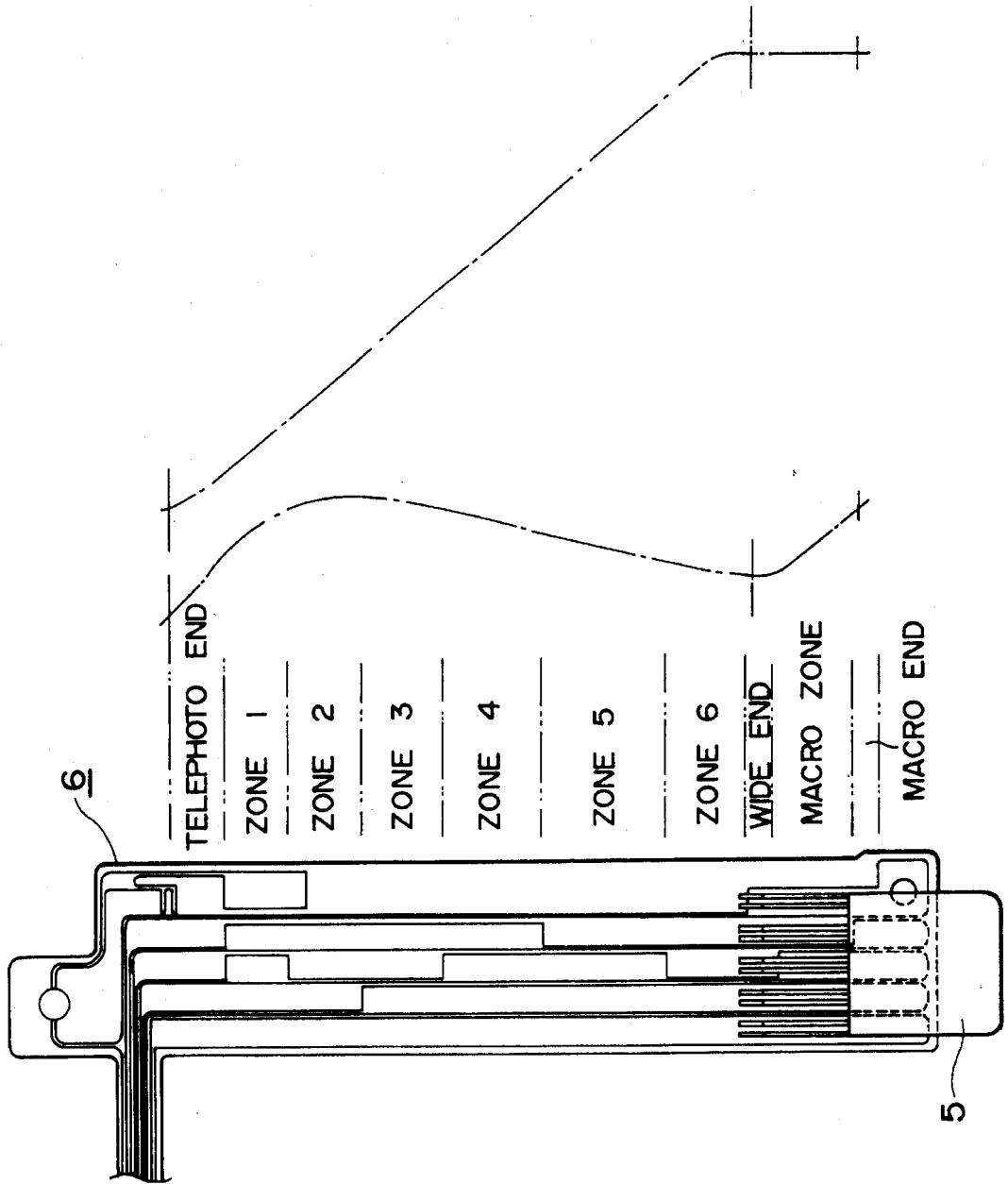
FIG. 5 shows an encoder pattern.
Figure 6:
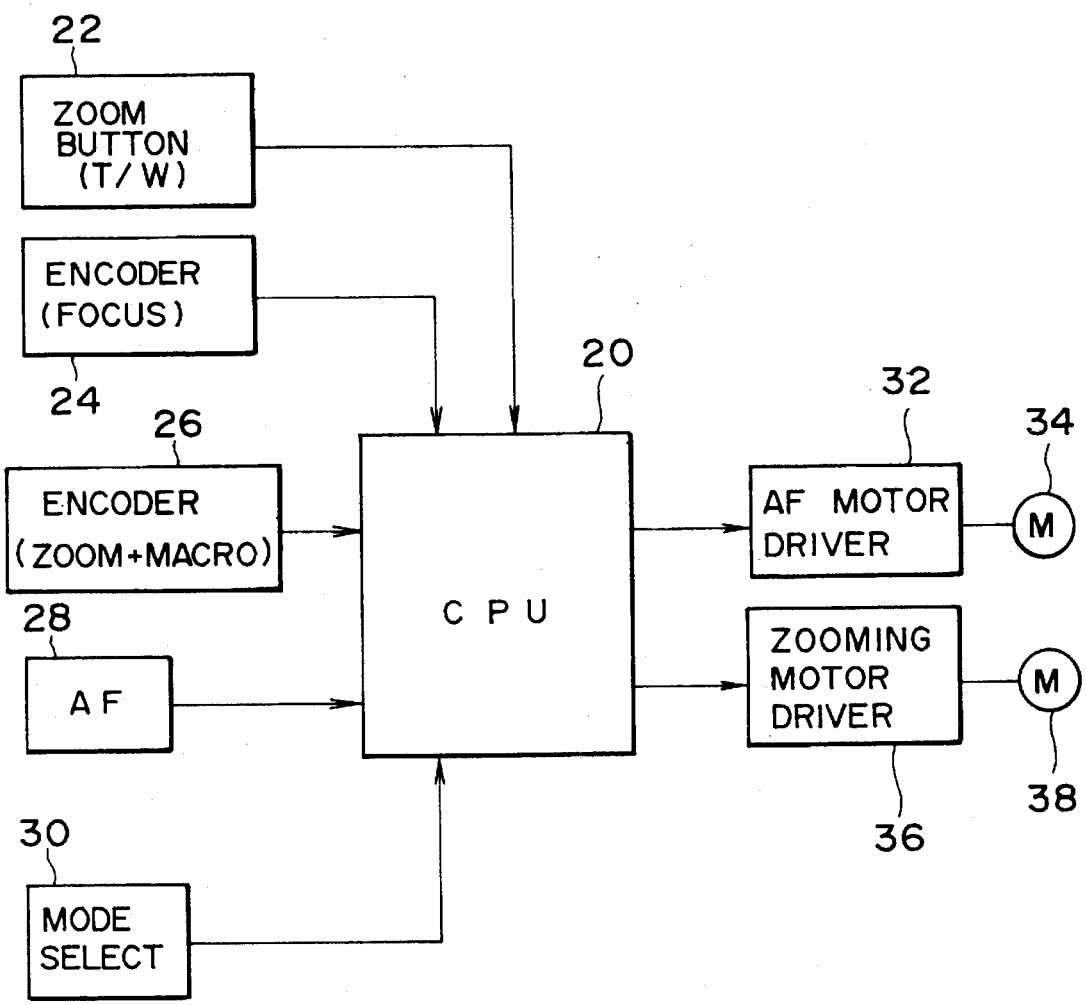
FIG. 6 is a block diagram of a circuit as an embodiment.
Figure 7:
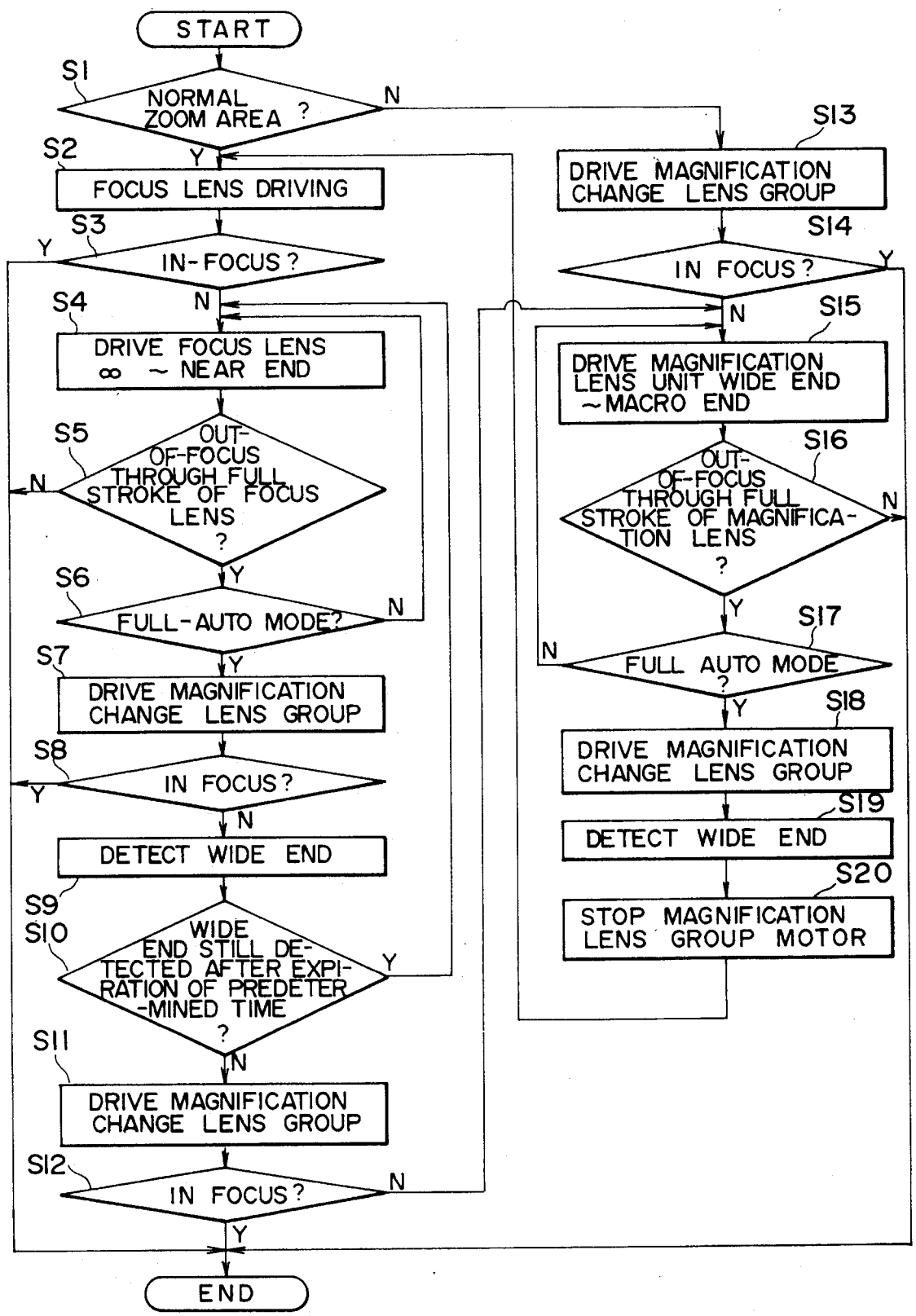
FIG. 7 is a flow chart showing the operation of the circuit of FIG. 6.

FIG. 1 is a cross-sectional view of a lens, FIGS. 2A and 2B are cross-sectional views of the essential portions, FIGS. 3A and 3B are developed views, FIG. 4 is a perspective view, FIG. 5 shows an encoder pattern, FIG. 6 is a circuit block diagram of the whole, and FIG. 7 is a flow chart. During the zooming operation by a zoom ring 1 being rotated, in the wide end state, a protruded portion 3a protruded from a macro knob 3 strikes against the protruded portion 2a of a fixed cylinder 2 and does not enter the macro wide area. When the photographer desires to manually shift the protruded portion 3a into the wide macro area, the photographer pushes the macro knob 3 in a radial direction, whereby the macro knob 3 is moved in the radial direction and the protruded portion 3a of the macro knob is brought into the same diametrical position as a space 2b below the protruded portion 2a of the fixed cylinder 2 and the engagement of the protruded portion 3a with the protruded portion 2a is released and therefore, the protruded portion 3a can enter the wide macro area.

Also, when photographing is to be effected in the wide macro by auto focus, the macro knob 3 is pushed in the radial direction and also is rotated in a clockwise direction. A second protruded portion 3b of the macro knob shown in FIGS. 3A and 3B strikes against a cam surface 4a provided on a zoom operating portion 4 and normally does not rotate. When the macro knob 3 is pushed in the radial direction, the second protruded portion 3b is moved in the radial direction and escapes from the cam surface 4a, and moves in a space 4b below the cam surface 4a and thereby becomes rotatable (see FIG. 4). As shown in FIG. 2A, the protruded portion 3a of the macro knob normally strikes against the protruded portion 2a of the fixed cylinder and provides a stopper, but the macro knob 3 rotates, whereby the protruded portion 3a escapes from the protruded portion 2a of the fixed cylinder and thus, the macro knob 3 can enter the wide macro area. At the same time, the second protruded portion 3b goes into a cam surface 4c provided on the zoom operating portion 4 and the macro knob 3 becomes unrotatable and is locked and thus, continuous wide macro photographing by auto focus becomes possible.

Also, when wide macro photographing is to be released by auto focus, the macro knob 3 is pushed in as in the above-described operation and is rotated in a counter-clockwise direction, whereby the release can be accomplished. Because the protruded portion 3a is of such structure that the macro knob 3 is pushed in and rotated, this protruded portion 3a becomes the same in diameter, without fail, as the space 2b below the protruded portion 2a of the fixed cylinder 2, whereby the state of wide macro photographing by auto focus can be released even if the zoom operating portion 4 is in the wide macro area.

Also, when the zoom operating portion 4 is in the normal photographing state and an inadvertent force is applied to the zoom operating portion 4 and the protruded portion 3a of the macro knob 3 strikes against the protruded portion 2a of the fixed cylinder 2, the second protruded portion 3b of the macro knob 3 rotates beyond the cam surface 4a of the zoom operating portion 4 and thus, the macro knob 3 will never be damaged.

In FIG. 1, the reference numeral 5 designates a brush for zooming fixed to the zoom ring 1, and the reference numeral 6 denotes an encoder pattern attached to a fixed cylinder 7. The brush 5 for zooming slides on the encoder pattern 6, whereby there can be obtained the focal length information of the telephoto end and wide end in the zoom area and of six zones therebetween, and the positional information of the macro end and macro zone in the wide macro area. The zoom ring 1 has its gear portion 1a brought into meshing engagement with the output gear of a zoom motor (see FIG. 6) and can accomplish the zooming operation by the motor drive. Although not described in detail, the zooming operation in the present embodiment is such that a cam cylinder 8 is rotated by the rotation of the zoom ring 1 and a variator lens v and a compensator lens c are moved in the direction of the optical axis on the basis of the displacement of two cam slots.

The reference numeral 9 designates a focus ring helicoid-coupled (indicated by "H" in FIG. 1) to the fixed cylinder 7, and further, the gear portion 9a of the focus ring 9 is in meshing engagement with the output gear of a focusing motor (see FIG. 6), whereby the focus ring 9 is rotated by the driving of the focus motor and a focusing lens F is moved in the direction of the optical axis. The reference numeral 10 denotes a brush for focusing which is fixed, and the reference numeral 11 designates an encoder pattern attached to the focus ring 9. By the brush 10 sliding, the positional information of the near end (minimum optical distance) and the infinity end can be detected.

The circuit block diagram of FIG. 6 will now be described.

The reference numeral 20 denotes a CPU for driving and controlling a focusing motor 34 and a zooming motor 38 on the basis of various kinds of information input thereto.

The reference numeral 22 designates a zoom button which is capable of performing two operations, i.e., zoom driving in the telephoto direction and zoom driving in the wide direction. The reference numeral 24 denotes an encoder for focusing (the brush 10 for focusing and the encoder pattern 11 in FIG. 1). The encoder 24 for focusing detects the positional information of the focusing lens F. The reference numeral 26 designates an encoder for zooming (the brush 5 for zooming and the encoder pattern 6 in FIG. 1). The encoder 26 for zooming detects the positional information of the lenses v and c in the zoom area and in the wide macro area. The reference numeral 28 denotes focus detecting means for detecting the in-focus by a signal from a conventional detection element. The reference numeral 30 designates mode select means for effecting the selection of the normal focus mode (a mode in which only the focusing lens F is moved to effect focusing) and the full-auto mode (a mode in which, because focusing on an object at a superclose position cannot be accomplished by the movement of only the focusing lens F, the lenses v and c for zooming area are forcibly moved toward the wide side and further to the wide macro area to thereby accomplish focusing).

The reference numeral 32 denotes a driving circuit for the focusing motor 34, and the reference numeral 36 designates a driving circuit for the zooming motor 38.

The operations of the circuit blocks of FIG. 6 will now be described with reference to the flow chart of FIG. 7.

[Step 1]

Whether the lenses v and c for zooming are now positioned in the zoom area or in the wide macro area is discriminated from the information of the encoder 26 for zooming. If the lenses are positioned in the zoom area, advance is made to a step 2, and if the lenses are positioned in the wide macro area, advance is made to a step 13.

[Step 2]

In order to obtain the in-focus, the focusing motor 34 is driven to thereby move the focusing lens F.

[Step 3]

Whether the in-focus has been obtained is judged. If the in-focus is obtained, the operation is terminated, and in the case of the out-of-focus (the in-focus being impossible), advance is made to a step 4.

[Step 4]

Since the in-focus has not been obtained by the normal focusing, the focusing lens F is reciprocally moved between the infinity end and the near end to perform the searching operation.

[Step 5]

Whether the in-focus has been obtained during the searching operation is discriminated, and if the in-focus has been obtained, the operation is terminated, and in the case of the out-of-focus (the in-focus being impossible), advance is made to a step 6.

[Step 6]

The current mode is detected. In the case of the normal mode, return is made to the step 4, where the searching operation is repeated, and in the case of the full-auto mode, advance is made to a step 7.

[Step 7]

The zooming motor 38 is driven to forcibly move the lenses v and c for zooming toward the wide side.

[Step 8]

Whether the in-focus has been obtained is discriminated, and if the in-focus is not obtained (the in-focus is impossible), advance is made to a step 9.

[Step 9]

When the wide end is detected by the information of the encoder 26, advance is made to a step 10. The zooming motor 38 continues to be driven.

[Step 10]

Whether the wide end detected state has continued for a predetermined time after the detection of the wide end or the wide macro area has been entered is discriminated. If the wide end detected state continues, it means that the full-auto mode has been selected with the stopper function by the macro knob 3 remaining operative, and since in this state, the lenses v and c for zooming cannot be moved any more toward the macro side, return is made to the step 4. If the macro knob 3 has its stopper function released, it becomes possible to enter the wide macro area, and in this case, advance is made to a step 11.

[Step 11]

The zooming motor 38 is further driven and the in-focus detection is effected in the wide macro area.

[Step 12]

Whether the in-focus has been obtained is discriminated, and if the in-focus is not obtained (the in-focus is impossible), advance is made to a step 15.

[Step 13]

Since the lenses v and c for zooming are already positioned in the wide macro area, the lenses v and c for zooming are driven in the wide macro area to thereby effect the in-focus detection.

[Step 14]

Whether the in-focus has been obtained is discriminated, and if the in-focus is not obtained (the in-focus is impossible), advance is made to a step 15.

[Step 15]

The searching operation in the wide macro area is performed to obtain the in-focus. That is, the zooming motor 38 is driven to reciprocally move the lenses v and c for zooming between the wide end and the macro end.

[Step 16]

Whether the in-focus has been obtained by the searching operation is discriminated, and if the in-focus has been obtained, the operation is terminated, and if the in-focus is not obtained (the in-focus is impossible), advance is made to a step 17.

[Step 17]

The mode is again confirmed, and in the case of the normal mode, return is made to the step 15, and in the case of the full-auto mode, advance is made to a step 18.

[Step 18]

The lenses v and c for zooming, are driven toward the zoom area to return these lenses v and c again into the zoom area and perform the operation for the in-focus.

[Step 19]

When the movement of the lenses v and c for zooming to the wide end is detected, advance is made to a step 20.

[Step 20]

The driving of the zooming motor 38 is stopped, and with the lenses v and c for zooming positioned at the wide end, return is made to the step 2, where the focusing operation by the focusing lens F is performed.

What is characteristic in the above-described embodiment is that the macro knob 3 which performs the stopper function can be maintained in two states, i.e., a first state in which the macro knob displays the stopper function to prohibit the movement thereof from the zoom area into the macro area, and a second state in which the macro knob releases the stopper function and can be freely moved between the zoom area and the macro area. Thereby, it has become possible to carry out a mode like the full-auto mode in which in order to obtain the in-focus, the lenses v and c for zooming must be positioned not only in the zoom area, but also in the zoom areas as required.

Also, in the present embodiment, when the full-auto mode is selected, but nevertheless the macro knob 3 is in a state in which it displays the function as a stopper, the lenses v and c for zooming remain unmoved at the wide end for a predetermined time by the information of the encoder 26 in spite of the zooming motor 38 being driven, whereby that state is detected and therefore, any detection switch of especially complex structure need not be provided on the macro knob 3.

Further, in the present embodiment, when the full-auto mode is selected in a state in which the macro knob 3 displays the function as a stopper, the focusing operation by only the focusing lens F and the focusing operation by the lenses v and c for zooming being moved in the wide direction are performed and therefore, the focusing operation is not stopped in its course.

The above-described embodiment is designed such that the stopper means capable of limiting the movement area of the lenses for zooming, and selecting by an operation a state in which the movement of the lenses from the zoom area to the macro area is prohibited and a state in which the prohibition is released can be maintained in the state in which the prohibition is released and therefore, the lenses for zooming can be moved from the zoom area to the macro area without any special operation being performed and thus, there can be realized a mode of novel concept which could heretofore not be conceived.

Also, in the present embodiment, when the mode in which the lenses for zooming are moved from the zoom area to the macro area in order to obtain the in-focus is to be executed, if the shift of the lenses from the zoom area to the macro area is prohibited by the stopper means, that prohibited state is discriminated by the moved states of the lenses for zooming and therefore, any switch for changeover detection need not be provided on the stopper means.

What is claimed is:

1. An optical apparatus comprising:

(a) a lens for zooming movable to a zoom area and a macro area;

(b) a lens moving mechanism for moving said lens from said zoom area to said macro area; and (c) stopper means to be changed over to a first state in which the movement of said lens from said zoom area to said macro area is prohibited and a second state in which the prohibition is released, means being provided so that said second state of said stopper means can be maintained.

2. An apparatus according to claim 1, wherein said lens is moved from said zoom area to said macro area by a manual operation.

3. An apparatus according to claim 1, wherein said lens is moved from said zoom area to said macro area with a zooming motor as a drive source.

4. An apparatus according to claim 1, wherein said stopper means includes an operating member which in its normal position assumes said first state and which is changed over to said second state by being manually moved in a first direction.

5. An apparatus according to claim 4, wherein said second state is maintained by said operating member being manually moved in said first direction, and thereafter being moved in a second direction.

6. An apparatus according to claim 2, wherein said lens is moved from a wide end position in said zoom area to said macro area by a manual operation.

7. An apparatus according to claim 3, wherein said zooming motor is driven in one direction to move said lens from a telephoto position in said zoom area to a wide position and the driving of said zooming motor in said one direction is continued to move said lens from said zoom area to said macro area.

8. An optical apparatus comprising:

(a) a first lens for zooming movable to a zoom area and a macro area;

(b) first moving means for moving said lens from said zoom area to said macro area with a first motor as a drive source;

(c) stopper means operable to be changed over to a first state in which the movement of said lens from said zoom area to said macro area is prohibited and a second state in which the prohibition is released, means being provided so that said second state of said stopper means can be maintained; and (d) discriminating means for discriminating which of said first and second states of said stopper means exists on the basis of the movement of said lens when said moving means is driven to move said lens from said zoom area to said macro area.

9. An apparatus according to claim 8, wherein said moving means is driven and controlled by an output of focus detecting means.

10. An apparatus according to claim 8, wherein said discrimination means has position detecting means for detecting the position of said lens, and discriminates that said stopper means is in said first state when it is detected by said position detecting means that said lens is not moved to said macro area.

11. An apparatus according to claim 8, wherein said stopper means includes an operating member which in its normal position assumes said first state and which is changed over to said second state by being manually moved in a first direction.

12. An apparatus according to claim 11, wherein said second state is maintained by said operating member being manually moved in said first direction, and thereafter being moved in a second direction.

13. An apparatus according to claim 10, wherein said first motor is driven in one direction to move said lens from a telephoto position in said zoom area to a wide position and the driving of said first motor in said one direction is continued to move said lens from said zoom area to said macro area.

14. An apparatus according to claim 8, further comprising:

a second lens for focusing; and second moving means for driving said second lens with a second motor as a drive source on the basis of an output of focus detecting means.

15. An apparatus according to claim 14, further comprising:

means for causing a first mode in which said second lens is driven to be in focus on the basis of the output of said focus detecting means and a second mode in which said first lens is driven to be in zoom on the basis of the output of said focus detecting means to be executed in a changeable-over manner.

16. An optical apparatus comprising:

(a) a first lens for zooming movable to a zoom area and a macro area;

(b) a second lens for focusing;

(c) first driving means for moving said first lens from said zoom area to said macro area;

(d) second driving means for moving said second lens;

(e) position detecting means for detecting the position of said second lens;

(f) focus detecting means for detecting an in-focus condition of an object viewed by said optical apparatus; and (g) control means for effecting first control for driving said second driving means to move said second lens and effect focus adjustment and second control for driving said first driving means to move said first lens and effect zoom adjustment, said second control in said control means moving said first lens to said zoom area and said macro area, said second control stopping said first lens at a boundary position between said zoom area and said macro area when an in-focus condition is not detected by said focus detecting means even if said first lens is moved into said macro area.

17. An apparatus according to claim 16, wherein said control means includes a CPU.

18. An apparatus according to claim 16, wherein said second lens is located forwardly of said first lens with respect to the optical axis thereof.

* * * * *